United States Patent [19]

Gagliardi, Jr.

[11] Patent Number: 5,667,436

[45] Date of Patent: Sep. 16, 1997

[54] METHOD FOR CUTTING ANIMAL KNUCKLE

[75] Inventor: Eugene D. Gagliardi, Jr., Atglen, Pa.

[73] Assignee: Visionary Design, Inc., Atglen, Pa.

[21] Appl. No.: 740,462

[22] Filed: Oct. 29, 1996

[51] Int. Cl.$^6$ ............................................. A22C 17/00
[52] U.S. Cl. ................................... 452/149; 452/135
[58] Field of Search ............................. 452/149, 135, 452/134, 125

[56] References Cited

U.S. PATENT DOCUMENTS

| | | | |
|---|---|---|---|
| 1,416,443 | 5/1922 | Brown | 452/149 |
| 3,644,963 | 2/1972 | Terranova | 452/135 |
| 3,992,734 | 11/1976 | Chiron et al. | 452/135 |
| 5,464,368 | 11/1995 | White et al. | 452/149 |

FOREIGN PATENT DOCUMENTS

| | | | |
|---|---|---|---|
| 2632823 | 12/1989 | France | 452/149 |
| 9107095 | 5/1991 | WIPO | 452/149 |

*Primary Examiner*—Willis Little
*Attorney, Agent, or Firm*—Panitch Schwarze Jacob & Nadel, P.C.

[57] ABSTRACT

A method for cutting an animal knuckle which has previously had the kneecap and all bones removed to provide meat products having substantially economic value comprises removing substantially all fat from the exterior surface of the knuckle. The principal muscles of the knuckle are located and identified. The knuckle is cut along one or more seams extending through the knuckle and around portions of the principal muscles to remove at least one principal muscle from the remainder of the knuckle. The removed muscle is denuded by removing substantially all cartilage, fat, connective tissue, membrane, and other non-muscle material from each outer surface to provide essentially a solid piece of meat. The denuded muscle is cut into at least two generally solid meat products, each meat product being very low in fat content and of relatively high economic value. Each of the meat products is tenderized prior to being sold to a consumer.

16 Claims, 5 Drawing Sheets

5,667,436

METHOD FOR CUTTING ANIMAL KNUCKLE

BACKGROUND OF THE INVENTION

The present invention relates generally to a method of cutting an animal carcass into edible meat products and, more particularly, to a method of cutting a knuckle, such as a beef knuckle, into a plurality of high value cuts or meat products.

The butchering and dressing of animals, such as cattle, for the purpose of producing edible meat or beef products is generally well known. Typically, such animals are butchered into well known meat products such as rib roasts, sirloin steaks, strip steaks, or the like. Typically, a side or quarter of beef is butchered by a meat cutter cutting or otherwise removing from the standing side or beef quarter as many "high value" beef products as feasible. Such high value beef products include roasts, steaks, and the like. Typically, once such high value cuts or products are removed from the standing side or beef quarter, the products are further processed by deboning, trimming, cleaning, and the like, and are thereafter wrapped and sold for relatively high per pound prices. The other less desirable or lower value components are also removed from the remainder of the side or beef quarter and along with any components trimmed from the higher value products, are placed into a meat grinder for making ground beef. Additional beef from other sources may also be added to the components in the grinder. The quality of the ground beef depends upon the source of the components being placed in the grinder (i.e., chuck, round, etc.), the amount of fat, and other factors. However, the per pound price of the ground beef is substantially less than the per pound price of the higher value products.

As the price of bringing beef and other animal products to market has risen, a need has also arisen for obtaining enhanced value from the beef or other animal. One way to provide such enhanced value is to reduce the amount of the beef which is placed in the meat grinder and to sell the beef which would have been placed into the meat grinder at a per pound price in excess of the price of the ground beef. The present invention comprises a method of cutting an animal or beef knuckle to provide new beef products having enhanced value. The knuckle generally comprises the lower portion of the round or hind leg of the animal and is generally not considered to be suitable for high quality products because it does not contain a large solid muscle component. A beef knuckle, in particular, contains many seams, membranes, cartilage, etc., and so the knuckle is typically used today only for the purpose of forming ground beef or perhaps a low value roast, such as a pot roast. The present invention comprises a method of removing from the knuckle one or more small muscles, each of which comprises substantially solid pieces of meat with minimal fat, cartilage, membrane, or the like. Each such muscle may thereafter be cut into high quality beef products which may be sold at relatively high per pound prices, particularly when compared with the price of ground beef. Because of the relatively high beef, low fat content, each such beef product can be considered to be "heart healthy". In addition to employing the present method in connection with a beef knuckle from the hind leg of an animal, the present invention may also be applicable to a knuckle from some other animal and/or to a knuckle from the front leg of any such animal.

BRIEF SUMMARY OF THE INVENTION

Briefly stated, the present invention comprises a method for cutting an animal knuckle which has previously had the kneecap and all bones removed therefrom to provide meat products having substantially enhanced value. The method comprises the steps of removing substantially all fat from the exterior surface of the knuckle and locating and identifying the principal muscles of the knuckle. The knuckle is cut along one or more seams extending through the knuckle and around portions of the principal muscles to remove at least one principal muscle from the remainder of the knuckle. The removed muscle is denuded by removing substantially all cartilage, fat, connective tissue, membrane, and other non-muscle material from each outer surface thereof to provide essentially a solid piece of meat. The denuded muscle is cut into at least two generally solid meat products, each meat product being very low in fat content and of relatively high economic value. Each of the meat products is tenderized.

BRIEF DESCRIPTION OF THE SPECIAL VIEWS OF THE DRAWINGS

The foregoing summary, as well as the following detailed description of a presently preferred embodiment of the invention, will be better understood when read in conjunction with the appended drawings. For the purpose of illustrating the invention, there is shown in the drawings an embodiment which is presently preferred. It should be understood, however, that the present invention is not limited to the particular arrangements and FIG. 1 is a perspective view of a beef knuckle with the kneecap and bones being previously removed;

DETAILED DESCRIPTION OF THE INVENTION

Figure 1:
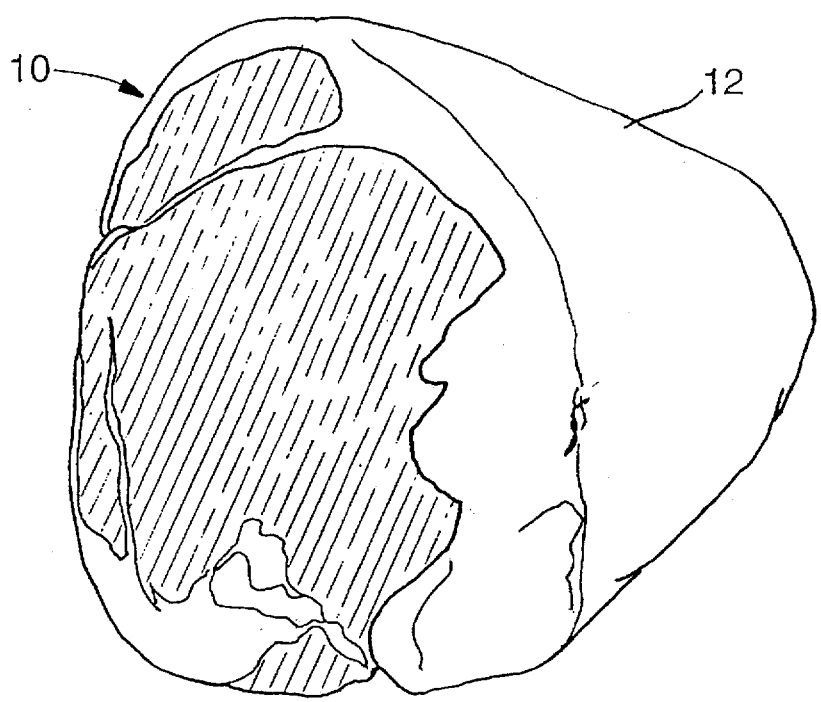

Referring in detail to the drawings, wherein like numerals are used to indicate the same elements throughout the several figures, there is shown in FIG. 1 a perspective view of a sirloin tip or beef knuckle 10. The beef knuckle 10 comprises the lower portion of the round or hind leg of beef proximate to the area of the kneecap. The beef knuckle 10 as shown in FIG. 1 has previously had the leg bones and kneecap removed. The beef knuckle 10 as shown is not presently considered to be high quality beef because it contains many seams, cartilage, membrane, etc., so that the beef knuckle 10 is not very tender. In the prior art, the beef knuckle 10 would generally be used only for being placed in a grinder to produce ground beef, or in some cases, for being thinly sliced and restructured into chip steaks, or for being cut down the middle and trimmed and tied to form an inexpensive round roast. Due to the relatively high amounts of cartilage or membrane, all three of such prior art uses are considered to be low economic value uses and each of the resulting beef products were sold at wholesale or retail for relatively low per pound prices. The present invention comprises a new method for significantly enhancing the economic value of the beef knuckle 10 by providing high quality beef products which can be sold at substantially higher per pound prices than the above-described prior art products produced from a beef knuckle 10. Essentially, the present invention comprises a method of removing from the beef knuckle 10 one or more substantially pure beef muscles which comprise substantially solid pieces of meat substantially without fat, cartilage, membrane, etc., and which may thereafter be made into high quality beef products which may be sold at relatively high per pound prices. Because of the relatively high beef, low fat content, the resultant beef product can be considered to be "heart healthy".

The following description of a preferred method of practicing the present invention relates to the boneless beef knuckle 10 cut from a beef round as shown in FIG. 1. It will be appreciated by those of ordinary skill in the art that the present invention has equal applicability to a knuckle cut from a beef chuck. It will also be appreciated by those of ordinary skill in the art that the present invention may also be applicable to knuckles obtained from other animals such as sheep, hogs, deer, etc. Thus, while the following description relates specifically to the beef knuckle 10 from a round as illustrated, the invention is not so limited.

Figure 2:
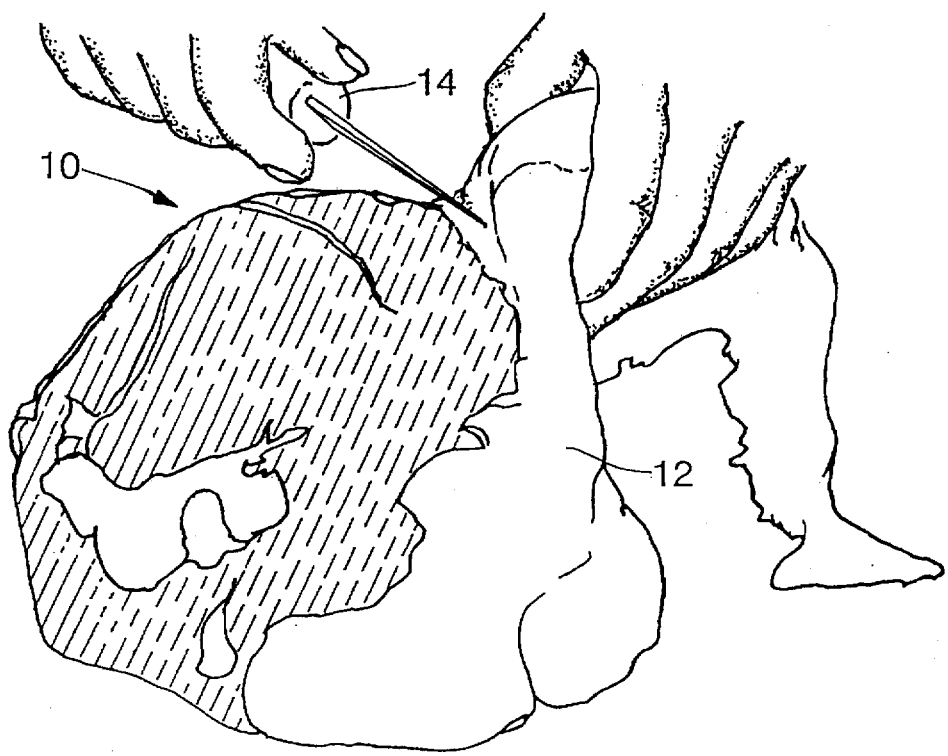
FIG. 2 is a view similar to FIG. 1 illustrating removal of the fat cap from the exterior of the beef knuckle.

The first step in the method of the present invention is to remove all or as much as possible of the fat layer or fat cap 12 which extends generally around the exterior surface of most of the beef knuckle 10. Preferably, the fat cap 12 is removed by effectively cutting the fat cap 12 away from the remainder of the beef knuckle 10 utilizing a sharp boning knife 14 or other suitable sharp tool. As shown in FIG. 2, the knife 14 is preferably inserted between the fat cap 12 and the remainder of the beef knuckle 10 beginning at one end of the knuckle 10 with the cut portion of the fat cap 12 being grasped and pulled away from the remainder of the knuckle 10 as the knife 14 is moved to cut between the fat cap 12 and the remainder of the knuckle 10 toward the other end of the knuckle 10. While it is preferable that the fat cap 12 be removed as essentially a single piece, it will be appreciated by those of ordinary skill in the art that the fat cap 12 can be removed in separate segments or pieces, if desired. Preferably, the process of removing the fat cap 12 from the remainder of the knuckle 10 is performed manually with a knife 14 as shown although it will be apparent to those of ordinary skill in the art that the fat cap removal process could be performed as an automated or partially automated process, if desired. For example, the fat cap 12 could be removed utilizing a wizard knife or the like. Similarly, although it is preferred that a boning knife 14 be used for manual removal of the fat cap 12, it will be appreciated by those of ordinary skill in the art that any other type of knife or other tool having the requisite length and cutting edge with the necessary degree of sharpness could be used in the alternative.

Figure 3:
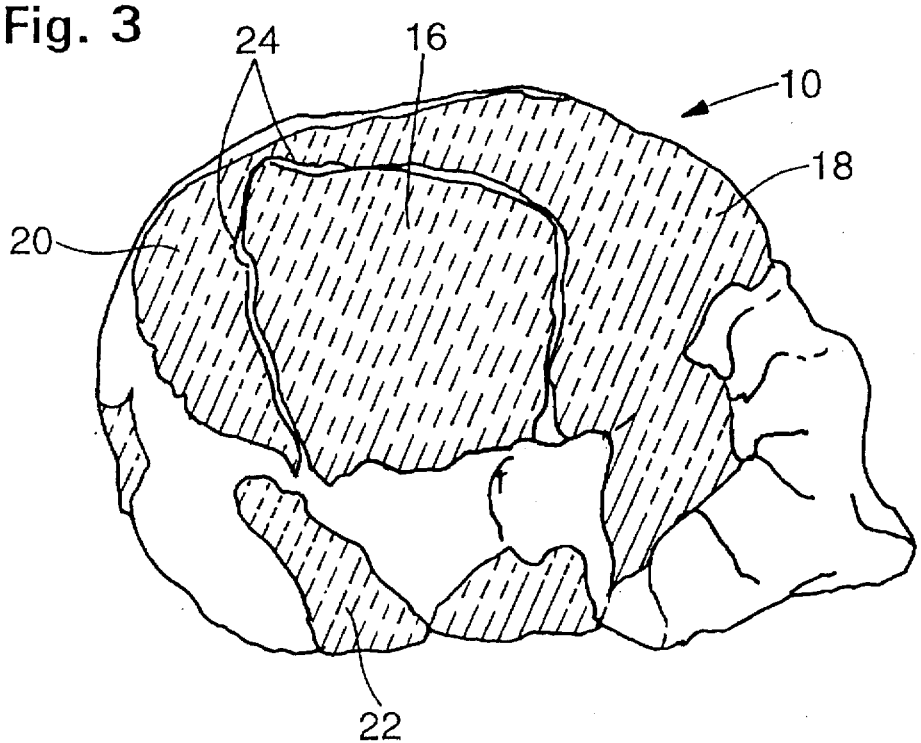
FIG. 3 is an end view of the beef knuckle of FIG. 1 with the fat cap removed for the purpose of illustrating the various muscles and seams therein.

After the fat cap 12 has been removed, the knuckle 10 is preferably oriented as shown in FIG. 3 so that the person (or people) performing the method is able to identify the principal muscles of the knuckle 10 and, more particularly, the various seams separating the principal muscles. As is well known to those of ordinary skill in the art, the beef knuckle 10 includes a first relatively large muscle (combined rectus femoris and vastus medialis muscles) often referred to as the center muscle 16, a second relatively large muscle (vastus lateralis muscle) generally referred to as the side muscle 18, and at least two additional, relatively smaller muscles 20, 22 (formed from the vastus medialis muscle). It is the principal four muscles 16, 18, 20, 22 which in accordance with the present invention are separated from the remainder of the knuckle 10 to provide the more enhanced value meat products as hereinafter discussed. It will be appreciated by those of ordinary skill in the art that there are additional, smaller muscles or areas of meat (not shown) present in the beef knuckle 10. However, the additional, smaller muscles or meat areas are considered to be too small to be efficiently used to create additional enhanced value meat products. In addition, the labor costs involved in extracting such smaller muscles or meat areas is too high to justify their individual removal.

Figure 4:
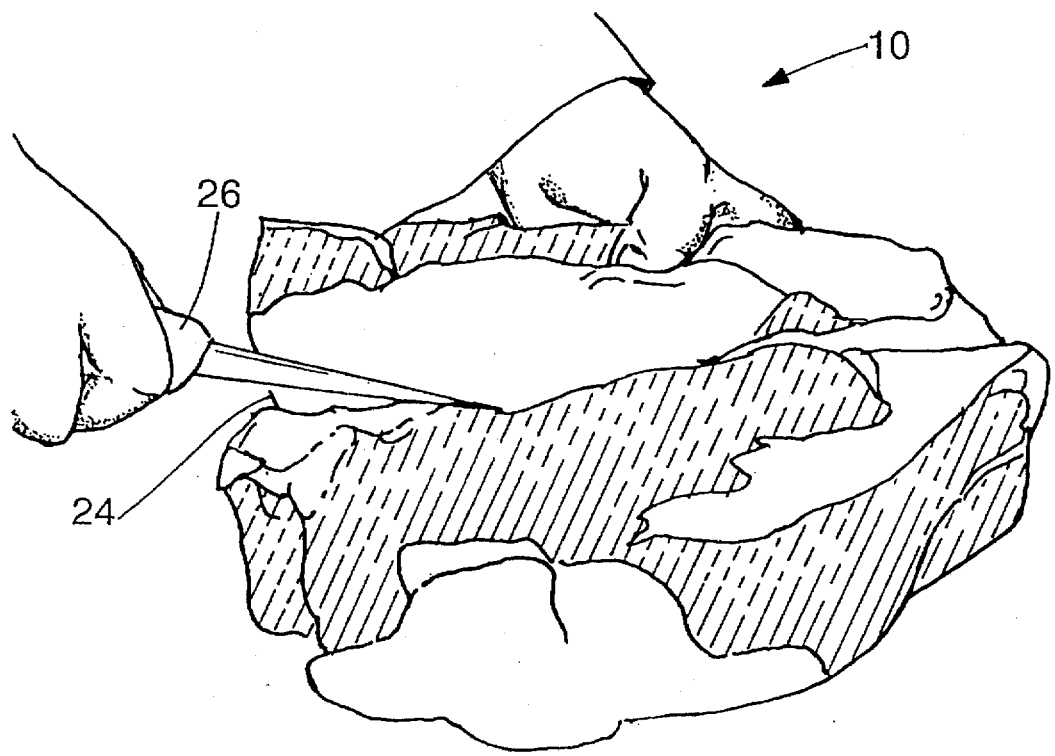
FIG. 4 is an end view of the beef knuckle of FIG. 1 showing the center muscles being removed by cutting along the seams thereof.
Figure 5C:
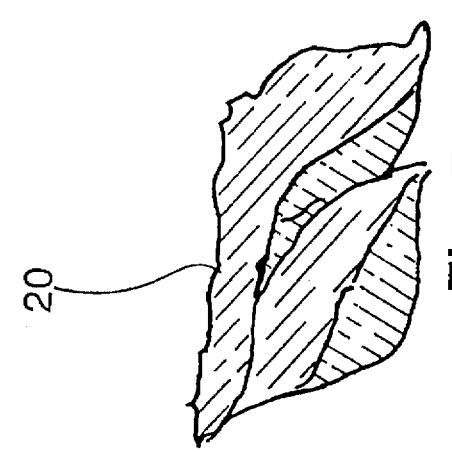
FIGS. 5a–5e are perspective plan view of the knuckle with the four principal muscles removed.
Figure 5B:
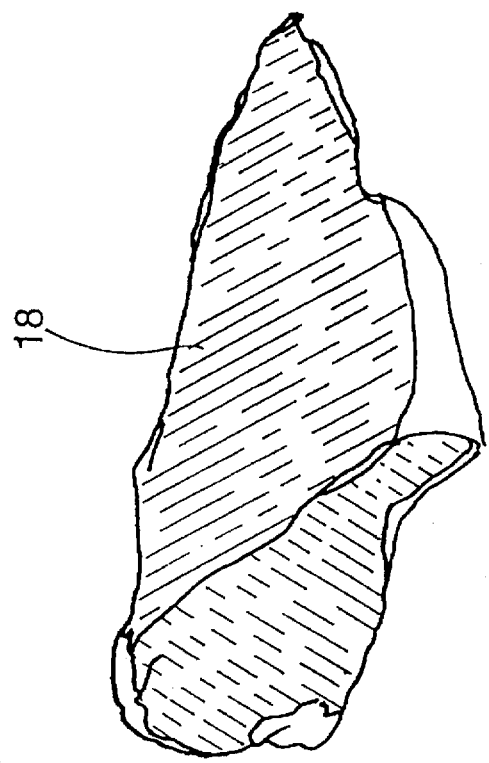
Figure 5E:
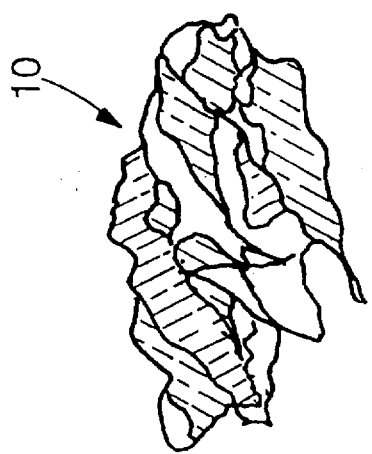
Figure 5D:
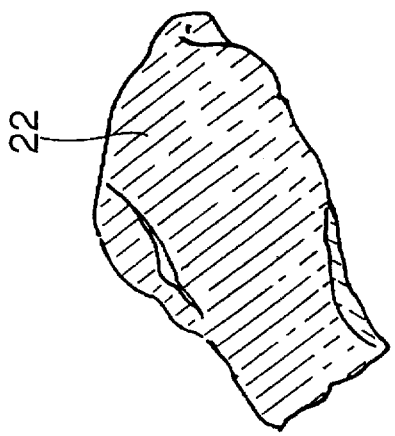
Figure 5A:
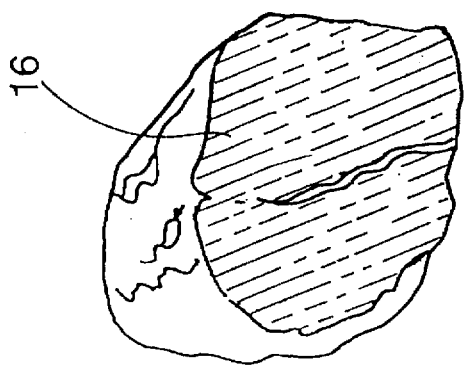

As shown in FIG. 3, the center muscle 16 is separated from the side muscle 18 and the smaller muscles 20, 22 by a series of seams 24. The seams 24 are essentially formed of the cartilage, membranes, connective tissues, and other such materials which hold the various muscles together. The center muscle 16 is removed from the remainder of the knuckle 10 by effectively grasping the side muscle 18 and cutting along the seam 24 extending between the side muscle 18 and the center muscle 16 as shown in FIG. 4. Preferably, the cutting is accomplished utilizing a relatively sharp boning knife 26. However, it will be appreciated by those of ordinary skill in the art that any other type of knife or other sharp tool may alternatively be employed. As the cut is made along the seam 24, the side muscle 18 is pulled away from the center muscle 16 and the center muscle 16 separates from and effectively falls away from the remainder of the knuckle 10. The same procedure is employed; i.e., cutting along the seam 24, for separating the side muscle 18, and for separating the smaller muscles 20, 22 from each other and from the remainder of the knuckle 10 as shown in FIGS. 5a–5e. Once all four of the principal muscles 16, 18, 20, 22 have been removed, the remainder of the knuckle 10 or trim consists of the smaller muscles, smaller meat areas, some portions of the seams and other connecting tissue, and some fat. Because the meat present in such smaller muscles and smaller meat areas is itself relatively low in fat and high quality, all of the remainder of the knuckle 10 can be placed in a grinder to form ground beef.

Figure 6:
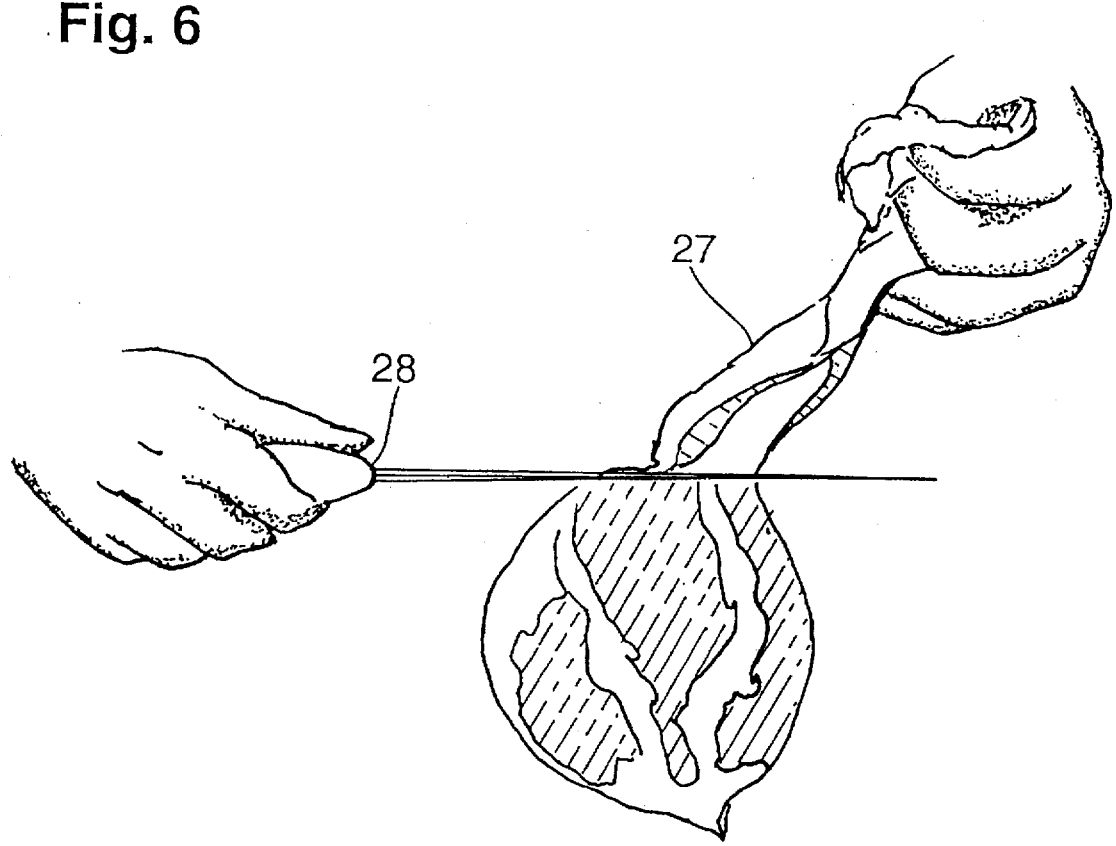
FIG. 6 is an elevational view of the center muscle of the beef knuckle illustrating the removal of some of the silver from one surface thereof.

The next step in the method of the present invention is to denude each of the four removed muscles 16, 18, 20, 22 by removing from each muscle all of the cartilage, membrane, fat, and other non-meat tissue, generally referred to as "silver" 27, which is present on each of the outer surfaces thereof. FIG. 6 illustrates removal of the silver 27 from one outer surface of the center muscle 16. Preferably, the silver 27 is removed from the center muscle 16 by effectively cutting the silver 27 from the muscle 16 utilizing a sharp boning knife 28. It will be appreciated by those of ordinary skill in the art that any other sharp knife or any other suitable sharp instrument could alternatively be employed for removal of the silver 27. The silver 27 could also be removed in any automated or semi-automated manner, for example, by using a mechanical skinner, or the like. Because the silver 27 generally very tightly engages the muscle 16, it may be necessary to cut away small portions of the muscle 16 along with the silver 27. The silver 27 is removed from all sides of the center muscle 16 resulting in a center muscle 16 which, when denuded, is effectively a pure solid piece of meat. Because the amount of fat present in the center muscle 16 is low, the center muscle 16, as well as the side muscle 18 and the smaller muscles 20, 22, qualify as being "heart healthy". All of the silver 27 is also removed from the outer surfaces of the side muscle 18 and the two smaller muscles 20, 22 in substantially the same manner. Removal of the silver 27 also removes some of the high quality meat from the muscles 16, 18, 20, 22. Accordingly, all of the removed silver 27 with the meat portions attached may also be put into a grinding machine with the remainder of the trim from the knuckle 10 to provide ground beef. The cartilage, membrane, etc., of the silver 27 is relatively gelatinous and, therefore, provides moisture to the ground beef, particularly when the ground beef is cooked on a grill as burgers or the like.

Each of the four denuded principal muscles 16, 18, 20, 22 may thereafter be made into a variety of meat products, all of which have a relatively high retail value. Preferably, all of the resulting meat products are subjected to a tenderizing process prior to being offered for sale. The preferred tenderizing process involves subjecting the meat products to jacquard needle tenderizing in a manner well known to those skilled in the art. However, it will be appreciated by those of ordinary skill in the art that any other suitable mechanical or non-mechanical tenderizing processes may alternatively be employed.

Figure 7:
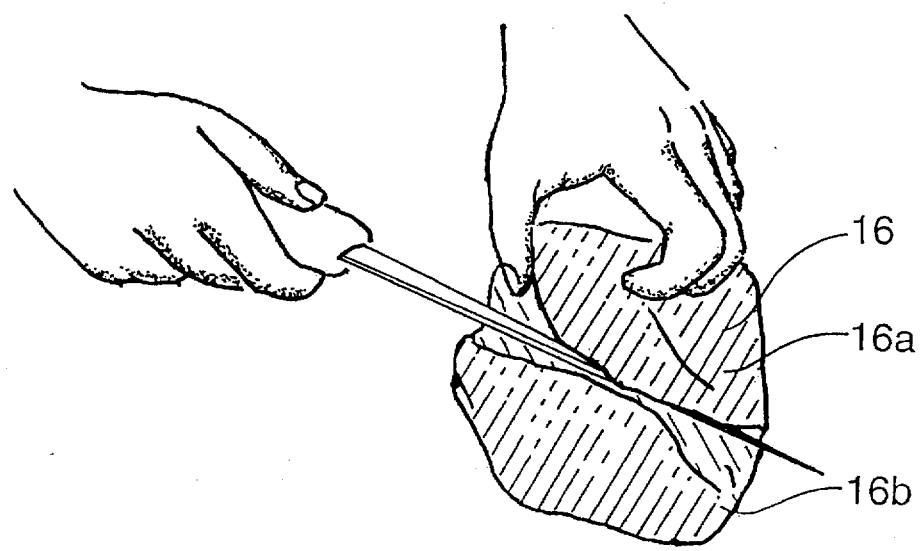
FIG. 7 is a perspective view showing the center muscle of FIG. 6 being cut lengthwise into two london broils.
Figure 8:
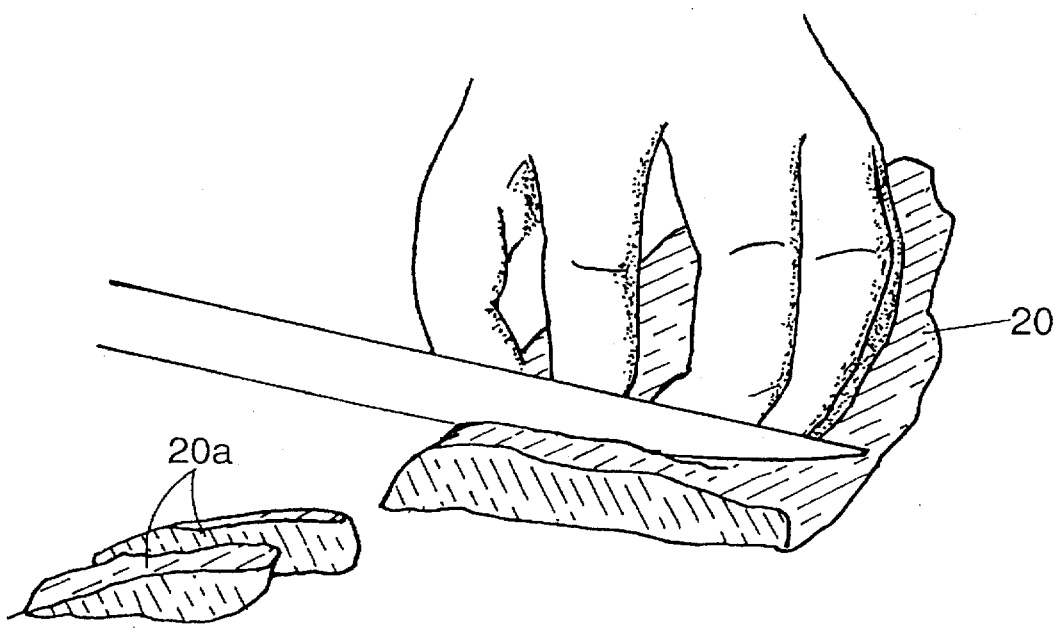
FIG. 8 is a perspective view of the center muscle of FIG. 6 being cut crosswise into a plurality of steaks.

The center muscle 16 may be sliced in half lengthwise as shown in FIG. 7 to form two boneless, heart healthy london broils 16a, 16b. Alternatively, the center muscle 16 may be sliced crosswise as shown in FIG. 8 into a series of boneless, heart healthy steaks 16c. Preferably, the steaks 16c are each approximately one inch thick so that a typical center muscle 16 results in the creation of about five such steaks with a small end portion 16d remaining. Each of the steaks 16c is approximately the size and shape of a tenderloin steak or filet mignon. The remaining small end portion 16d of the center muscle 16 can thereafter be cut into sirloin tips, beef cubes, beef kebabs, or the like (not shown).

The side muscle 18 can also be cut into london broils or can be cut crosswise into boneless, heart healthy steaks (not shown). A typical side muscle 18 results in approximately five such steaks with each steak resembling the shape of a sirloin strip steak but without any bone or surrounding fat. Again, the remaining small end portion of the side muscle 18 can be cut into sirloin tips, beef cubes, beef kebabs, etc. (not shown).

Figure 9:
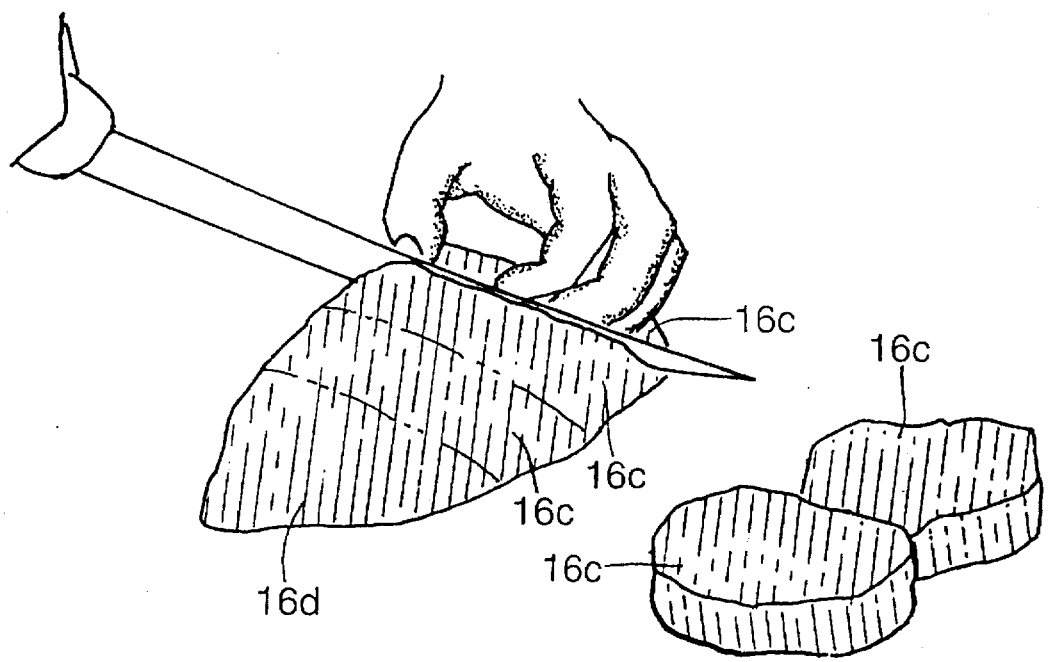
FIG. 9 is a perspective view of one of the smaller muscles of the beef knuckle being cut into small strips.

Finally, the two smaller muscles 20, 22 can be left whole as london broils or can be cut into sirloin tips, beef cubes, beef kebabs, etc. Alternatively, as shown in FIG. 9, the two smaller muscles 20, 22 can be thinly sliced into four millimeter width strips 20a and thereafter tumble marinated, seasoned, battered, and breaded to form beef fajitas.

It will be appreciated by those of ordinary skill in the art that the above-described method is highly effective in converting what would normally be relatively low per pound priced beef products into a series of relatively high per pound priced beef products. The high priced beef products resulting from the present invention are boneless and are generally considered to be "heart healthy" because they contain only a minimum amount of fat. The present invention can thus be employed for adding substantial economic value to a beef knuckle 10.

I claim:

1. A method for cutting an animal knuckle which has previously had the kneecap and all bones removed therefrom to provide meat products having substantially enhanced value, the method comprising:

removing substantially all fat from the exterior surface of the knuckle;

locating and identifying the principal muscles of the knuckle;

cutting along one or more seams extending through the knuckle and around portions of the principal muscles to remove at least one principal muscle from the remainder of the knuckle;

denuding the removed muscle by removing substantially all cartilage, fat, connective tissue, membrane, and all other non-muscle material from each outer surface thereof to provide essentially a solid piece of meat;

cutting the denuded muscle into at least two generally solid meat products, each such meat product being very low in fat content and of relatively high economic value; and tenderizing each such meat product.

2. The method as recited in claim 1 wherein the tenderizing step is performed by a mechanical tenderizing apparatus.

3. The method as recited in claim 2 wherein the mechanical tenderizing apparatus comprises a needle tenderizing apparatus.

4. The method as recited in claim 1 wherein all of the steps except for the tenderizing step are performed manually.

5. The method as recited in claim 4 wherein the removing, cutting, and denuding steps are each performed using a knife.

6. The method as recited in claim 1 wherein the removed muscle is the center muscle.

7. The method as recited in claim 6 wherein the meat products are formed by cutting the center muscle lengthwise into two generally equal pieces, each piece comprising a london broil.

8. The method as recited in claim 6 wherein the meat products are made by cutting the center muscle crosswise into a plurality of steaks, each steak having a predetermined thickness.

9. The method as recited in claim 8 wherein the thickness of each steak is approximately one inch.

10. The method as recited in claim 6 wherein the meat products comprise small, generally bite-sized pieces used for cubes, kebabs, and the like.

11. The method as recited in claim 1 wherein the removed muscle is the side muscle.

12. The method as recited in claim 11 wherein the meat products are made by cutting the side muscle crosswise into steaks, each steak having a predetermined thickness.

13. The method as recited in claim 11 wherein the thickness of each steak is approximately one inch.

14. The method as recited in claim 1 wherein the meat products are made by cutting the muscle crosswise into small pieces having a thickness of approximately four millimeters.

15. The method as recited in claim 1 wherein at least four principal muscles are removed from the remainder of the knuckle, each such principal muscle being denuded and thereafter cut into at least two generally solid meat products.

16. A food product made in accordance with the method of claim 1.

* * * * *